US012766948B2

(12) United States Patent
Zeidler et al.

(10) Patent No.: US 12,766,948 B2
(45) Date of Patent: Oct. 20, 2026

(54) OPENING AND CLOSING DEVICE FOR A MOTOR VEHICLE

(71) Applicant: Weber GmbH & Co. KG, Dillenburg (DE)

(72) Inventors: Martin Zeidler, Dautphetal (DE); Andreas Beck, Waldbrunn (DE)

(73) Assignee: Weber GmbH & Co. KG, Dillenburg (DE)

( * ) Notice: Subject to any disclaimer, the term of this patent is extended or adjusted under 35 U.S.C. 154(b) by 369 days.

(21) Appl. No.: 18/565,130

(22) PCT Filed: Feb. 3, 2023

(86) PCT No.: PCT/EP2023/052684
§ 371 (c)(1),
(2) Date: Nov. 29, 2023

(87) PCT Pub. No.: WO2023/148331
PCT Pub. Date: Aug. 10, 2023

(65) Prior Publication Data
US 2024/0313466 A1 Sep. 19, 2024

(30) Foreign Application Priority Data
Feb. 7, 2022 (DE) ..................... 10 2022 102 787.2

(51) Int. Cl.
*B60K 15/05* (2006.01)

(52) U.S. Cl.
CPC ...... *B60K 15/05* (2013.01); *B60K 2015/0515* (2013.01); *B60K 2015/0523* (2013.01); *B60K 2015/0553* (2013.01); *B60K 2015/0569* (2013.01)

(58) Field of Classification Search
CPC .... B60K 2015/0435; B60K 2015/0515; B60K 2015/0523
See application file for complete search history.

(56) References Cited

U.S. PATENT DOCUMENTS

| | | | | |
|---|---|---|---|---|
| 12,473,771 | B2 * | 11/2025 | Ha | B60K 1/00 |
| 2003/0178434 | A1 | 9/2003 | Kato | |
| 2009/0090476 | A1 * | 4/2009 | Grandel | B60R 11/0235 49/362 |
| 2017/0356228 | A1 | 12/2017 | Herczeg | |
| 2018/0105036 | A1 | 4/2018 | Guardianelli | |
| 2023/0151668 | A1 * | 5/2023 | Winker | E05F 15/638 49/362 |

(Continued)

FOREIGN PATENT DOCUMENTS

| | | | | |
|---|---|---|---|---|
| CN | 212422848 U | * 1/2021 | | |
| CN | 113753139 A | * 12/2021 | | E05F 15/41 |

(Continued)

*Primary Examiner* — Robert E Fuller
(74) *Attorney, Agent, or Firm* — Rogowski Law LLC

(57) ABSTRACT

An opening and closing device (10), such as for a charging port on electric vehicles or a fuel filler neck on vehicles with a combustion engine, has a flap unit (68), an actuator (30) for moving the flap unit (68), and a housing (16). The flap unit (68) has at least one guide element (114) which engages in a guide slot (126, 130) formed in the housing (16). The flap unit (68) is coupled to a cross-piece or traverse that can be moved by the actuator by means of at least one coupling element.

13 Claims, 24 Drawing Sheets

(56) References Cited

U.S. PATENT DOCUMENTS

| | | | | |
|---|---|---|---|---|
| 2023/0311642 | A1* | 10/2023 | Sun | B60K 15/05 296/97.22 |
| 2023/0382217 | A1* | 11/2023 | Kaneko | E05D 15/20 |
| 2024/0018821 | A1* | 1/2024 | Ha | B60L 53/16 |

FOREIGN PATENT DOCUMENTS

| | | | | | |
|---|---|---|---|---|---|
| CN | 114852189 | A | * | 8/2022 | E05F 15/697 |
| CN | 217198390 | U | * | 8/2022 | |
| CN | 119981577 | A | * | 5/2025 | |
| DE | 102015206715 | A1 | | 10/2016 | |
| DE | 102020211845 | A1 | | 12/2021 | |
| KR | 20210100889 | A | * | 8/2021 | E05D 15/20 |
| WO | WO-2016096274 | A1 | * | 6/2016 | B60R 7/06 |

* cited by examiner

OPENING AND CLOSING DEVICE FOR A MOTOR VEHICLE

CROSS-REFERENCE TO RELATED APPLICATIONS

This application is a national stage application (under 35 USC § 371) of PCT/EP2023/052684, filed Feb. 3, 2023, which claims benefit of DE 102022102787.2, filed Feb. 7, 2022, the contents of each of which is incorporated by reference herein.

BACKGROUND OF THE INVENTION

Technical Field and State of the Art

Motor vehicles have flaps or covers on the body that cover, for example, a charging port on electric vehicles or a fuel filler neck on vehicles with a combustion engine. The flap is folded up to the side when the electric vehicle is to be charged and the charging port needs to be accessible. When closed, the flap should shield or insulate the charging port as well as possible from external and environmental influences. A seal is usually also provided for this purpose, on which the flap sits when closed.

To ensure that the vehicle is available and can be used at all times, the charging port must be accessible at the desired time. In particular, this means that the driver can open the flap without the use of tools. External influences such as extreme cold, ice or snow can make it very difficult to operate the flap. Icing in particular can make it difficult to open and close the flap. In heavy snowfall, it can be difficult to bridge the seal when closing the flap.

DE 10 2015 206 715 A1 discloses a device for opening and closing a charging flap of a vehicle, whereby the charging flap closes a charging port arranged inside the outer skin of the vehicle, in which a charging socket is arranged. When open, the charging flap is arranged inside the charging port and is guided on a guide device arranged inside the charging port in such a way that it can be slid under the outer skin surrounding the charging port opening in the manner of a sliding door.

The disadvantage of known opening and closing devices for charging flaps is that they require a large installation space.

SUMMARY OF THE INVENTION

The invention is based on the task of providing an improved opening and closing device with a flap in particular for a motor vehicle.

This task is solved in accordance with the invention in that the flap unit has at least one guide element which engages in a guide slot formed in the housing, and in that the flap unit is coupled by means of at least one coupling element to a traverse or cross-piece which can be displaced by means of the actuator.

Advantageous embodiments of the invention are the subject matter of the dependent claims.

The invention is based on the consideration that an opening and closing device should on the one hand close and release the flap robustly and reliably, but on the other hand should be designed to be cost-effective and space-saving.

As has now been discovered, these requirements can be met by coupling the flap unit with coupling elements to a traverse that can be moved by the actuator.

The guide slots are preferably designed as guide grooves. The guide grooves are advantageously designed to be closed. The guide elements are preferably designed as guide pins. We have henceforth used the more general term "guide slot", of which the guide recesses are a preferred embodiment. Alternatively, the respective guide slot can also be designed as a web, and the respective guide element can be groove-shaped.

Advantageously, the at least one coupling element is designed as a rocker arm, which is rotatably attached to the traverse and rotatably attached to the flap unit. In this way, precise guidance and movement of the flap or flap unit can be achieved on the curves specified by the guide slots.

The traverse advantageously comprises at least one gear rack. The traverse can be formed in one piece with the gear rack. In an alternative embodiment, the traverse can comprise a traverse element to which the gear rack is attached. The respective gear rack can be brought into engagement with a gear wheel or a gear shaft, which is driven by an actuator, whereby a precise movement of the flap or flap unit can be achieved.

In a first preferred embodiment, the respective gear rack is designed rigid. In a second preferred embodiment, the respective gear rack is designed to be bendable and/or articulated in order to achieve more degrees of freedom in the design of the assembly. In this case, the bendable and/or articulated gear rack is guided in the area from the force introduction (drive) to the force discharge (traverse) in a guide in the housing that encompasses the gear rack in a suitable form in order to prevent kinking. This allows tensile and compressive forces to be transmitted in an optimized manner when opening and closing.

Advantageously, the toothed rack can be moved transversely by means of a synchronous gear unit to prevent jamming or uneven running. This design means that all drive elements are in one plane, resulting in a small installation space requirement. The drive can be easily connected from the inside. The flap can also move obliquely without requiring increased installation space, as the synchronous gear unit can be interlocked. In an alternative, preferred embodiment, a synchronous shaft can be provided.

In an advantageous embodiment, two toothed racks are arranged on two opposite sides of the flap, enabling optimized force transmission to the flap on both sides. Preferably, two rocker arms are provided, both of which are coupled to the flap. In an alternative, advantageous design, the kinematics are reduced to one rocker arm or, instead of two individual rocker arms, a correspondingly wider rocker arm is used, which couples both traverses to the flap. The use of two rocker arms leads in particular to a synchronization of the flap, provides protection against tilting, allows better force absorption or transmission into the guides, and leads to less compliance with external forces (tilting of the flap).

In a preferred embodiment, guide elements are arranged in the area of two opposite sides of the flap. In particular, the guide elements are advantageously arranged on opposite sides as seen in the direction of movement of the flap.

In a preferred embodiment, two guide elements are arranged in the area of a first side and one in the area of the opposite side. The fact that these guide elements are arranged in the area of the side of the flap or the flap unit means in particular that they can be arranged directly on this side or adjacent to this side on the neighboring sides. The flaps usually move upwards. With a laterally moving flap, the lower guide is in the main soiling area. In this case, the lower guide can be omitted.

In a preferred embodiment, the housing comprises a mount for the actuator. This protects the actuator from external influences. Pre-assembly of the assemblies is also possible. The mount of the actuator can be designed in such a way that the synchronous gear unit can also be covered and thus protected from dirt or ingress of water or snow.

Advantageously, the device comprises an emergency release device so that the flap can be opened even if the actuator fails or malfunctions. It is a common requirement that the flap mechanism can at least be released via a suitable emergency release mechanism if the electric drive fails, so that the flap can then be opened manually.

Preferably, the emergency release device comprises a pulling device connected to a traverse. Pulling on the pulling device moves the traverse, which in turn moves the flap from a locked or closed position to an open position so that it can be fully opened by hand. In the case of the technical solution described below, where the traverse is held by the rocker arms tilted beyond the dead center, it is sufficient to manually move the traverse out of the end position against the drag torque of the electric drive and other forces. This makes it necessary to use an electric drive without self-locking.

In the simplest case, the pulling device is designed in such a way that a type of hook takes the traverse with it when the pulling device (hook) is pulled in the opening direction and so that the traverse is also moved in the opening direction. The emergency release moves the flap a little inwards and slightly towards the open position, which makes further manual opening easier. If the rear of the actuator can be made accessible, it is also possible to manually open the cover directly and completely using a suitable tool (engagement in the internal gearing of the actuator).

If it is necessary to realize an emergency release transverse to the direction of travel, an inclined surface or emergency release incline 186 is advantageously arranged on the underside of the traverse, against which a cam rests when the emergency release device is actuated and moves the traverse via the incline.

The flap unit comprises a flap and preferably a flap carrier. It also preferably comprises a seal, which is arranged between the flap and the flap carrier.

The device is advantageously designed in such a way that the respective coupling element or the rocker arm is arranged in a closing direction in such a way that the coupling element or the rocker arm blocks a movement perpendicular to the flap. In particular, this is preferably achieved by the coupling element or the rocker arm exceeding a dead center.

The flap is preferably designed as a charging flap for an electric charging port. It is arranged on the vehicle, preferably on the body of the vehicle. The invention also relates to a motor vehicle with a device described above, wherein the flap is arranged on the vehicle, preferably on the body of the vehicle. The flap is attached to the body via a swivel-sliding movement.

The advantages of the invention lie in particular in the fact that the opening and closing device can be easily integrated into the motor vehicle due to the small installation space requirement. The combination of the functional elements for moving the sliding charging flap and locking it in the closed position results in functional integration: no separate functional elements (e.g. actuator) are required for locking in the closed position. This in particular results in a simple and space-saving design.

It is also advantageous to avoid exposed elements of the kinematics, e.g. guide grooves, guide pins, etc., or openings through which water and dirt can enter the kinematics. This enables the flap to be moved in a robust manner.

The opening and closing device described provides an increase in force that can be used in particular as an ice-breaking function. The available forces increase with steeper rocker arms. This allows icing to be broken up when opening and snow to be displaced/pressed into the trough, at least to a limited extent, when closing.

The kinematics are implemented in a particularly compact installation space with the actuator arranged on the inside, as the installation space is a critical limitation, especially for inward-moving charging flaps. A standard actuator can be used or adapted, resulting in a simple design and reduced validation costs.

If the actuator comprises an electric motor and a synchronous gearbox coupled to the motor, a standard actuator can be used and the required transmission ratio can be realized with the aid of the gear unit.

The device is suitable for all (charging) flaps where the covers are opened horizontally or vertically on the inside with a sliding movement.

An embodiment of the invention is explained in greater detail based on a drawing. All the features described and/or illustrated form the subject of the present invention, either individually or in any meaningful combination, even independently of their summary in the claims or their relationship to one another.

DESCRIPTION OF THE DRAWINGS

Partially schematically, the drawings show.

In all figures, the same parts are labeled with the same reference symbols.

DETAILED DESCRIPTION

Figure 1:
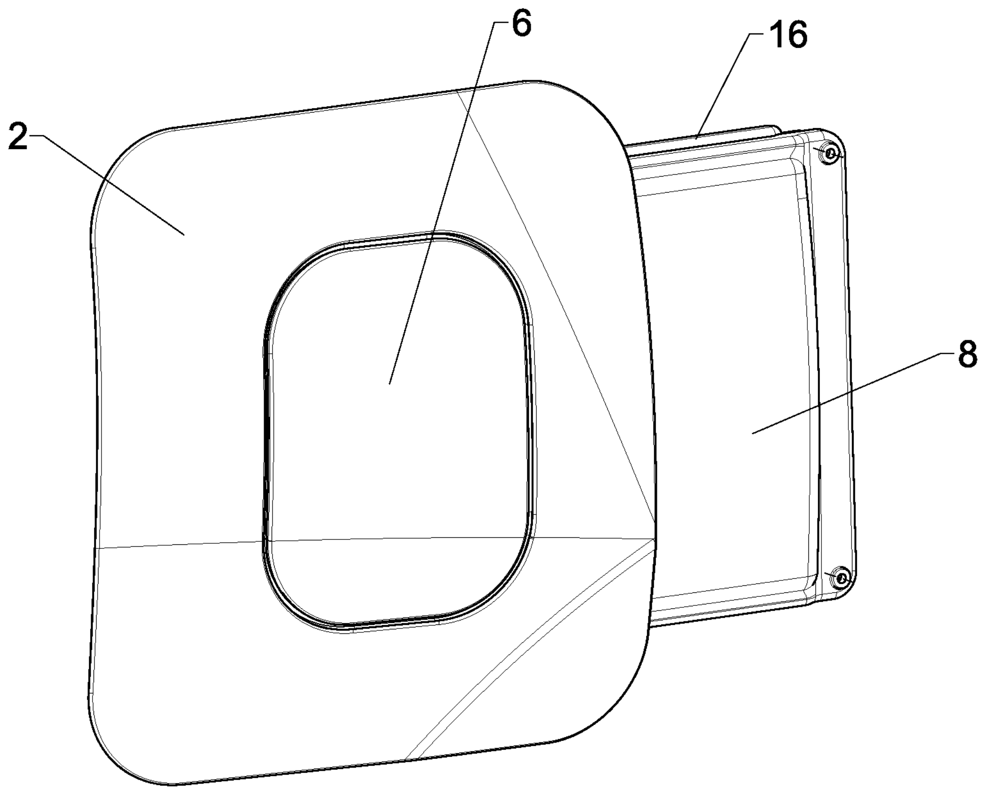
FIG. 1 a front view of a charging flap and a housing cover.
Figure 2:
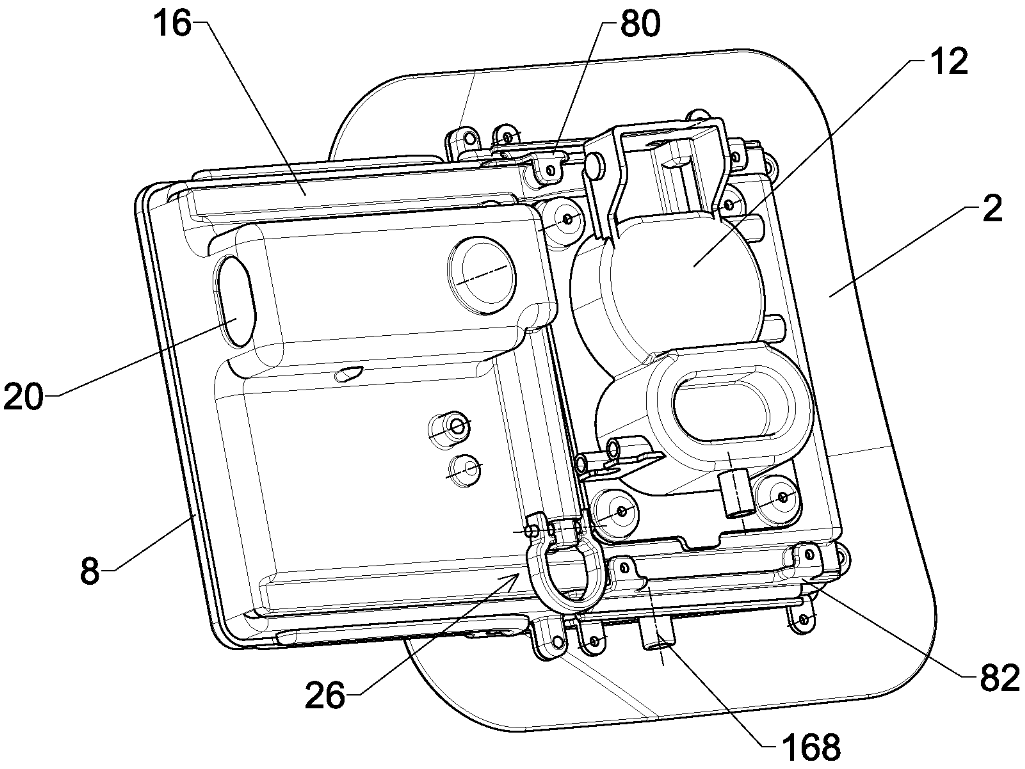
FIG. 2 the charging flap shown in FIG. 1 and a rear view of a housing.
Figure 3:
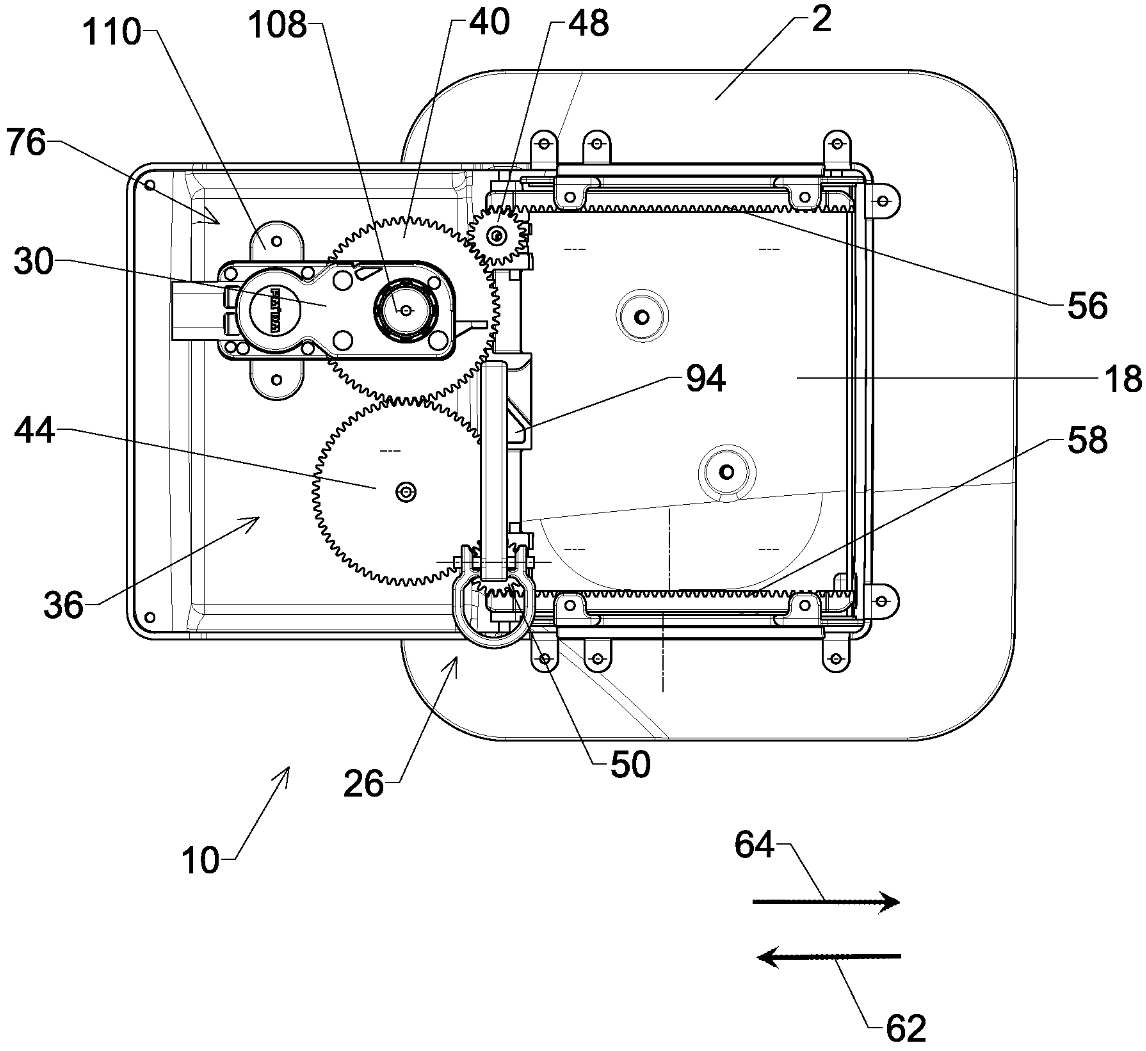
FIG. 3 a rear view of an opening and closing device in a preferred embodiment, FIG. 4 the opening and closing device according to FIG. 3 in an exploded view, FIG. 5 an exploded view of a flap unit, FIG. 6 an exploded view of a rocker arm unit, FIG. 7 an exploded view of a drive unit, FIG. 8 the opening and closing device according to FIG. 3 in a closed position in a longitudinal section, FIG. 9 an enlarged section of FIG. 8, FIG. 10 the opening and closing device according to FIG. 3 in an emergency release position in a longitudinal section, FIG. 11 an enlarged section of FIG. 10, FIG. 12 the opening and closing device according to FIG. 3 in a more open position in a longitudinal section, FIG. 13 the opening and closing device according to FIG. 3 in a fully open position in a longitudinal section, FIG. 14 the opening and closing device according to FIG. 3 in a lateral section, FIG. 15 perspective view of the opening and closing device according to FIG. 3 with an emergency release device, FIG. 16 an exploded view of the emergency release device shown in FIG. 15, FIG. 17 a housing of the opening and closing device according to FIG. 3 in a perspective view, FIG. 18 a sectional perspective view of the housing shown in FIG. 17, FIG. 19 a further sectional perspective view of the housing shown in FIG. 17, FIG. 20 a sectional perspective view of the housing shown in FIG. 17 with the actuator inserted, FIG. 21 a side view of the opening and closing device shown in FIG. 3, FIG. 22 another side view of the opening and closing device shown in FIG. 3, FIG. 23 a plan view of the opening and closing device according to FIG. 3, and FIG. 24 the opening and closing device according to FIG. 3 in a lateral section.

FIG. 1 shows a section of a fender 2 as well as a flap 6 and a housing cover 8 of an opening and closing device 10 shown in FIG. 3 in a preferred embodiment. FIG. 2 shows a rear view of the fender 2 and a charging module 12. A housing 16 of the opening and closing device 10 has a plug bushing 20 for connection to the vehicle electrical system or, for connection to both the vehicle electrical system and an emergency release device 26, the function of which is described below.

FIG. 3 shows a rear view of the opening and closing device 10. The opening and closing device 10 has an actuator 30, which is designed as an electric motor. The actuator 30 drives a synchronous gear unit 36, which comprises an actuator gear wheel 40 driven directly by the actuator 30 and an intermediate gear 44 in engagement with the actuator gear wheel 40. The actuator 30 and the synchronous gear 36 are components of a drive unit 76.

In the present embodiment example, the two gear wheels 40, 44 have the same number of cogs and the same diameter. The actuator gear wheel 40 is engaged with a first synchronous gear wheel 48. The first synchronous gear wheel 48 is engaged with a first gear rack 56. The intermediate gear wheel 44 is engaged with a second synchronous gear wheel 50, which is engaged with a second gear rack 58. The two synchronous gear wheels 48, 50 are part of the synchronous gear unit 36.

In this way, both gear racks 56, 58 move in parallel and at the same speed in a closing direction 62 to close the flap 6 and in an opening direction 64 opposite to the closing direction 62 to open the flap 6. The two gear racks 56, 58 are connected to a common cross-piece or traverse 94 for this purpose. A flap carrier 18 is also shown, see also FIG. 5.

Figure 4:
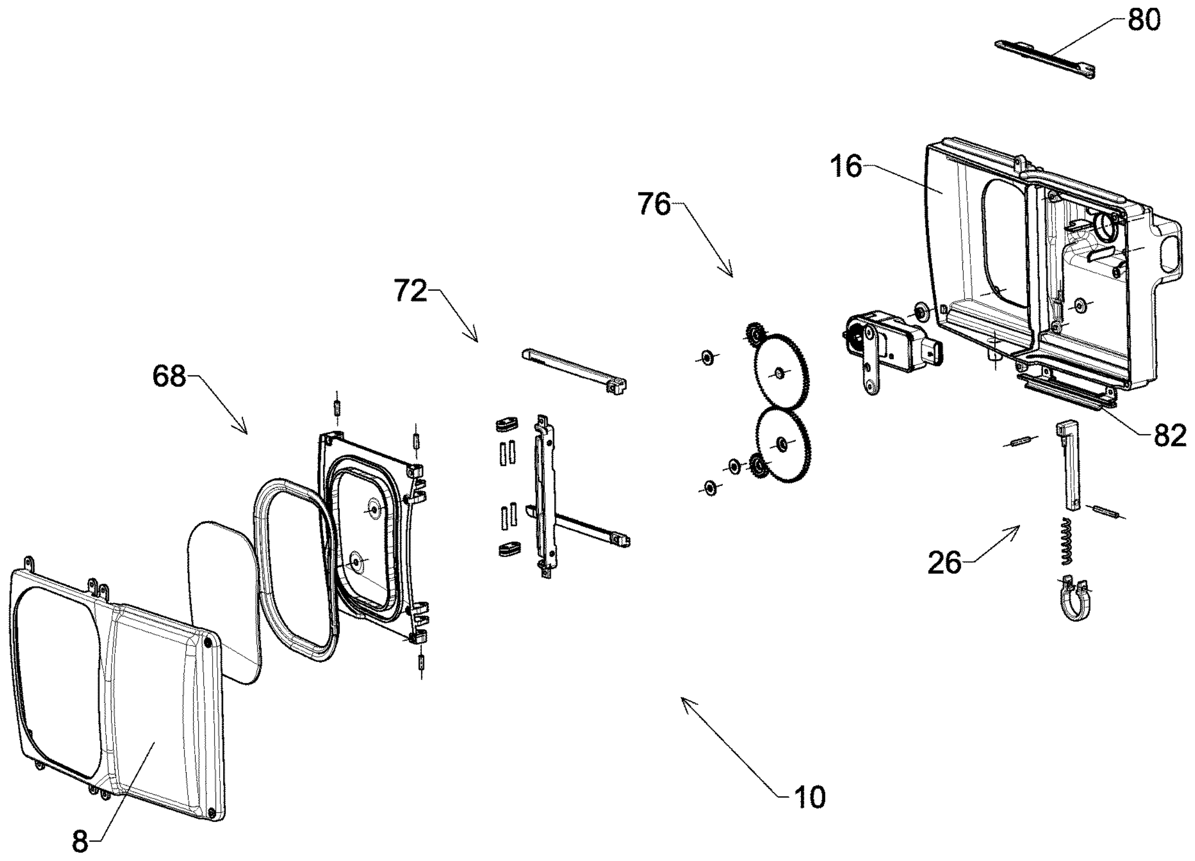

FIG. 4 shows an exploded view of the opening and closing device 10. It has a flap unit 68, a rocker arm unit 72 and the drive unit 76, which are described in connection with the following figures. It also includes two rack and pinion guide covers 80, 82.

Figure 5:
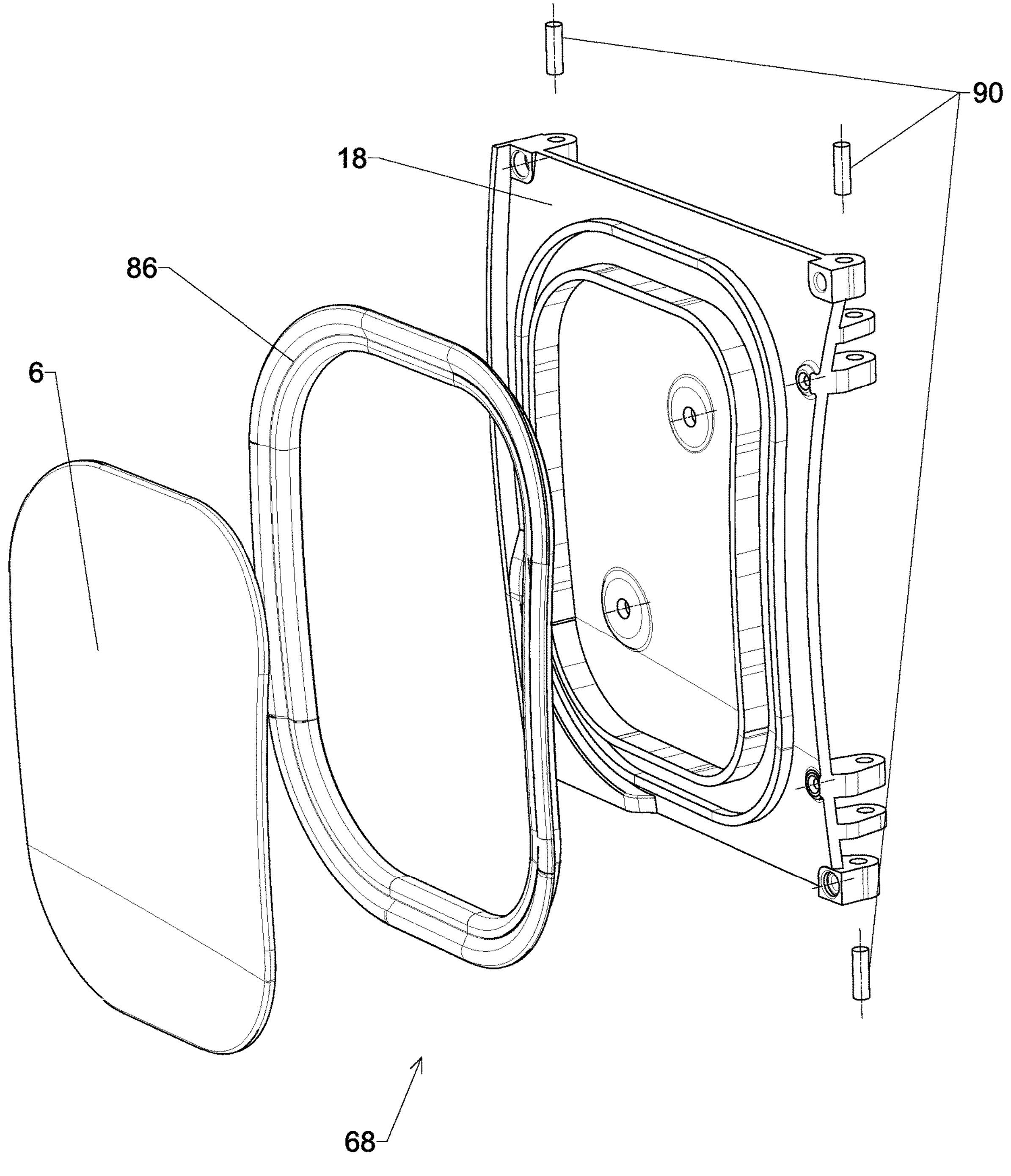

FIG. 5 shows the flap unit 68 in an exploded view. A seal 86 and the flap 6 are arranged on the flap carrier 18. The guide pins 90 are fastened or inserted into the flap carrier 18 and run in guide grooves 124, 128 of the housing 16, see FIG. 8.

Figure 6:
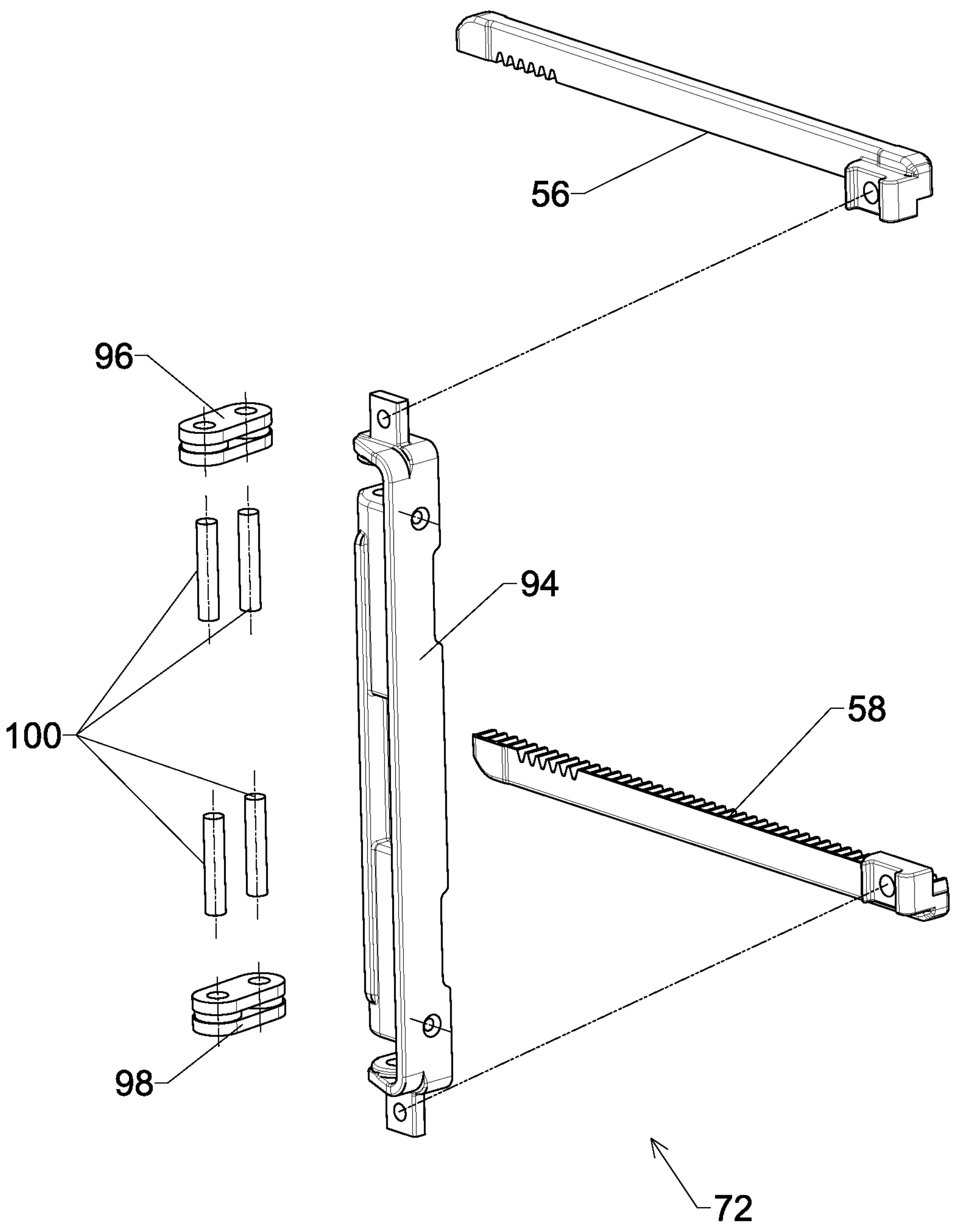

FIG. 6 shows the rocker arm unit 72 in an exploded view. The two gear racks 56, 58 are rigidly connected to the traverse 94, which in the present embodiment example is realized by means of a screw connection. The rocker arm unit 72 further comprises two rocker arms 96 and rocker arm shafts 100. The respective rocker arm 96, 98 is rotatably attached to the traverse 94 by means of a rocker arm shaft 100. The other two rocker arm shafts 100 are used to rotatably attach the rocker arms 96, 98 to the flap 6.

Figure 7:
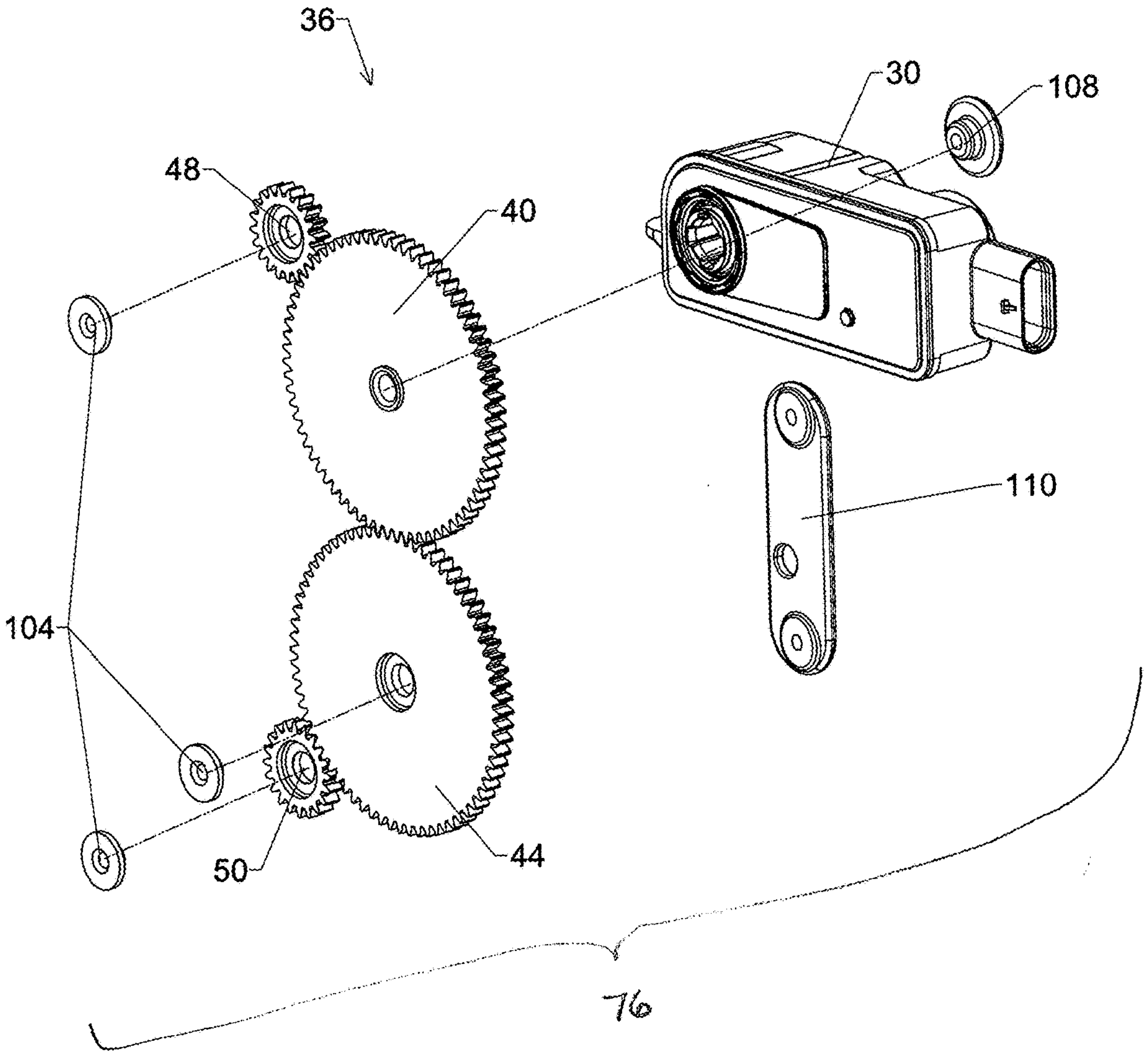

FIG. 7 shows the drive unit 76 in an exploded view. The drive unit 76 comprises the actuator 30, the two gear wheels 40, 44, which in the preferred embodiment example shown both have the same diameter and 68 teeth each, and the two synchronous gear wheels 48, 50. It further comprises an actuator fastening 110, which is screwed to the housing 16 to fasten the actuator 30. An actuator gear mount washer 108 is secured by a screw threaded through the actuator 30 into the actuator gear wheel and is used to secure the actuator gear wheel 40 in the actuator 30. The synchronous gear wheels 48, 50 are attached to the housing 16 by means of gear wheel mounts 104.

Figure 8:
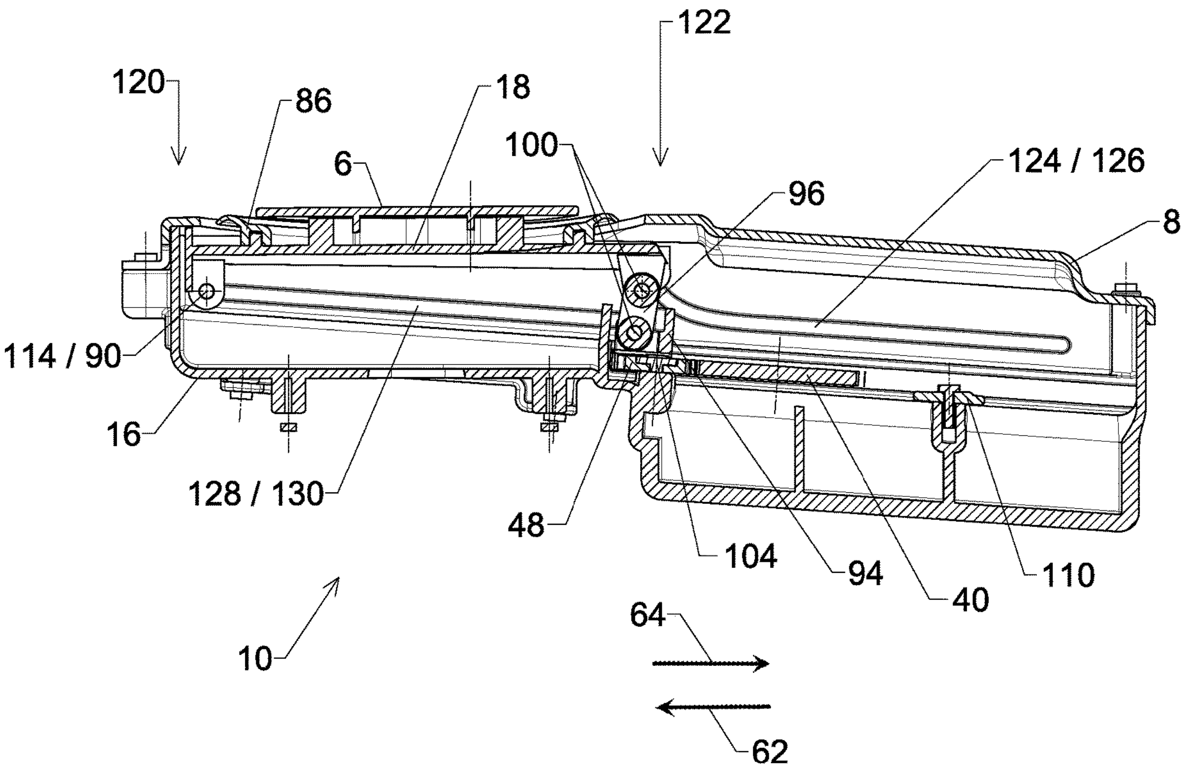

FIG. 8 shows a side section of the opening and closing device 10. The flap carrier 18 has guide elements 114, which in the present embodiment example are designed as guide pins 90. A guide pin 90 is located in the flap carrier 18 in the position closer to side 120 and, correspondingly, a guide slot 130, which is designed as a guide groove 128, is located in the housing 16. In the position further from 120 there are two guide pins in the flap support 18 and two guide slots 126 designed as guide grooves 124 in the housing 16.

The flap 6 or the flap carrier 18 has guide elements 114 on both sides, which are guide cams/pins that are guided in the corresponding guide grooves 124, 128 in the housing 16. The guide grooves 124, 128 are advantageously designed closed. The flap 6 or the flap carrier 18 is hinged to the traverse 94 or the slider via the two rocker arms 96, 98. The two gear racks 56, 58 are integrated into the traverse 94 on both sides. The synchronous gears 48, 50 engage in the respective gear rack 56, 58, which prevent the traverse 94 from tilting in the guide and ensure smooth running. The first gear wheel 40 is driven by the actuator 30. By moving the traverse 94 in the opening direction 64, the flap 6 is first lowered from the closed position via the guide curve in a controlled manner using the increasingly flattening rocker arms 96, 98 and then dragged behind the traverse 94 until the opening position is reached.

By moving the traverse 94 in the closing direction 62, the flap 6 is first pushed in the direction of the closed position and then pressed into the opening in the direction of the closed position by means of the rising rocker arms 96, 98. If the rocker arms 96, 98 are perpendicular to the traverse direction, they reach their dead center and the flap 6 has reached its maximum closing position. The flap 6 can no longer be opened by external forces, in particular in the indicated direction of force 134, which is perpendicular to the closing direction 62. This configuration is shown in FIG. 8.

Figure 9:
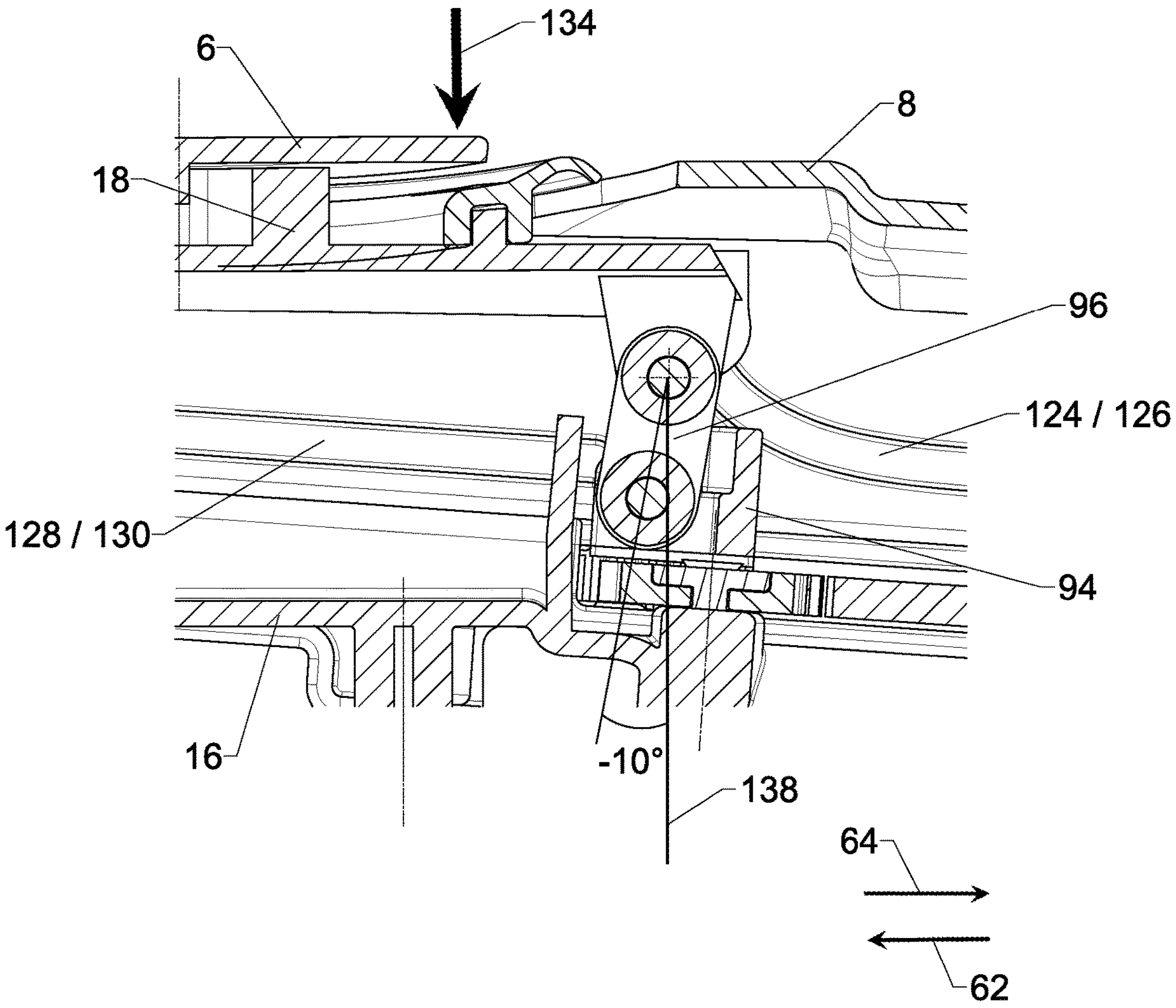

There is a risk that the traverse 94 could move out of the closed position during operation due to impacts and vibrations, causing the flap 6 to open, unless the drive is designed to be self-locking or a separate locking mechanism is provided. This effect is countered by moving the traverse 94 in the closed direction until the rocker arms 96, 98 assume an inclined position beyond the dead center, see FIG. 9, which shows an enlarged section of FIG. 8. Since the rocker arm 96 shown is moved 10° beyond the dead center in the closed position compared to a vertical direction 138, which is perpendicular to the closing direction 62, the external force application acts against a stop and is thus locked. When external forces are applied, the flap 6 is then always pressed in the closed direction. A static force that acts vertically inwards on the flap 6 can also be applied. This force ensures that the flap 6 is always held in the closed position via the rocker arms 96, 98. A separate solution for holding the end position is therefore unnecessary. The force can be applied, for example. A circumferential seal between flap 6 and the body can be used. Other elastic elements can also provide this force.

Figure 10:
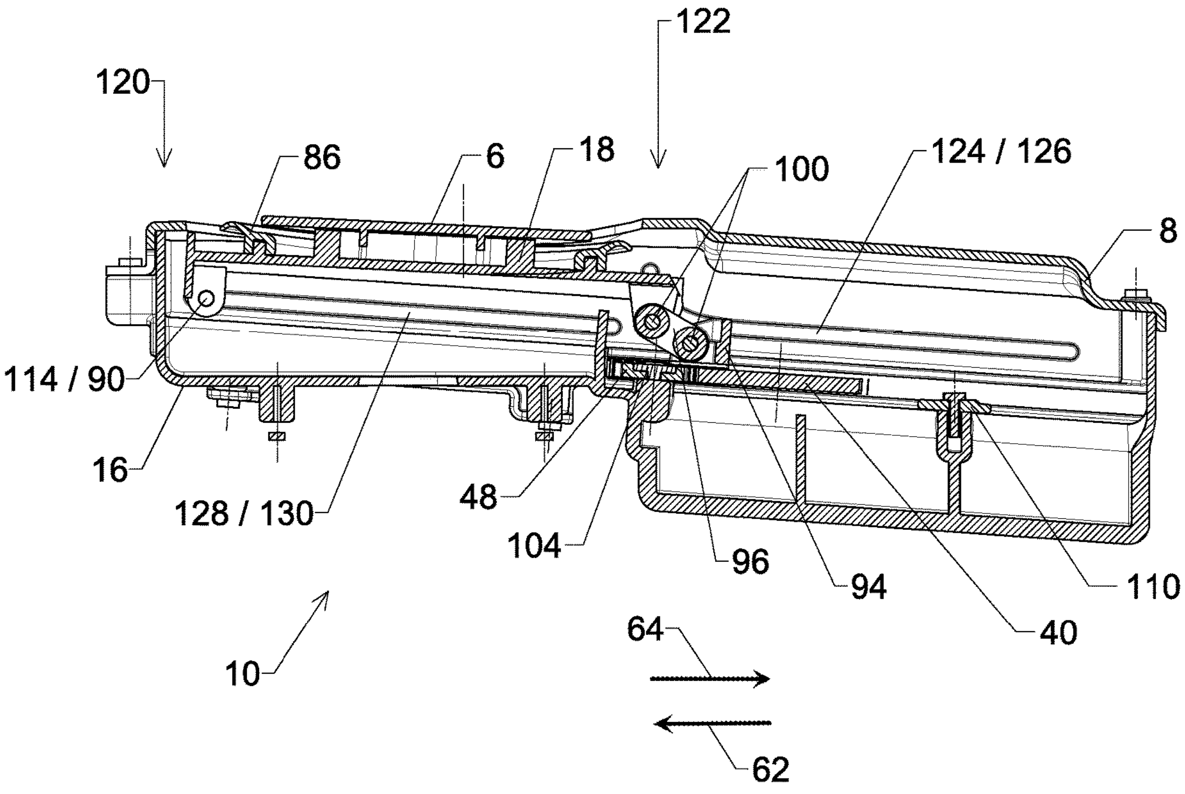
Figure 11:
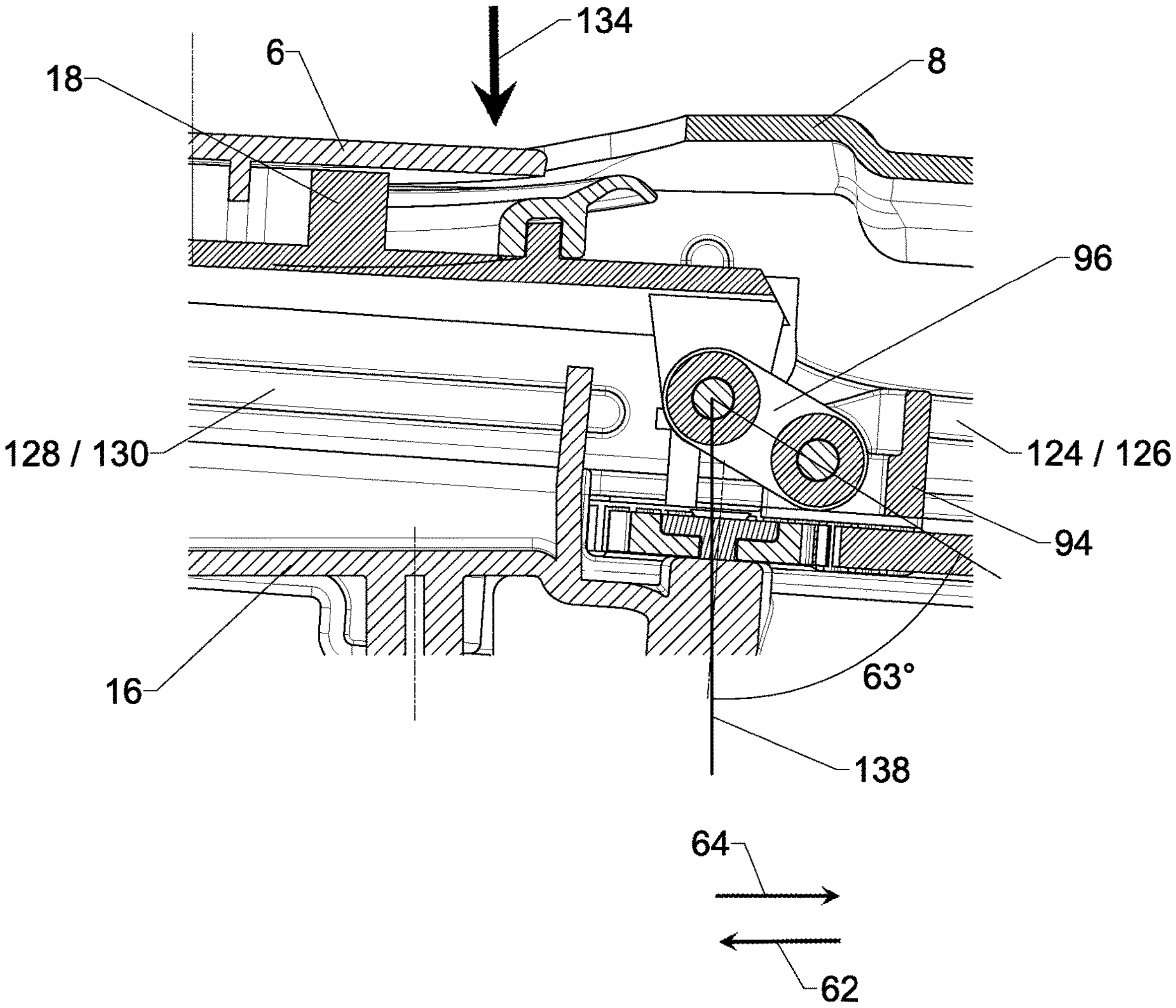

FIG. 10 shows the opening and closing device 10 in a configuration that corresponds to an emergency release position, which is shown in detail in FIG. 11. During emergency release, the rocker arms 96, 98 are moved above the dead center so that the system is no longer locked. When closing, the front guide slot 126 helps to raise the rocker arm.

Figure 12:
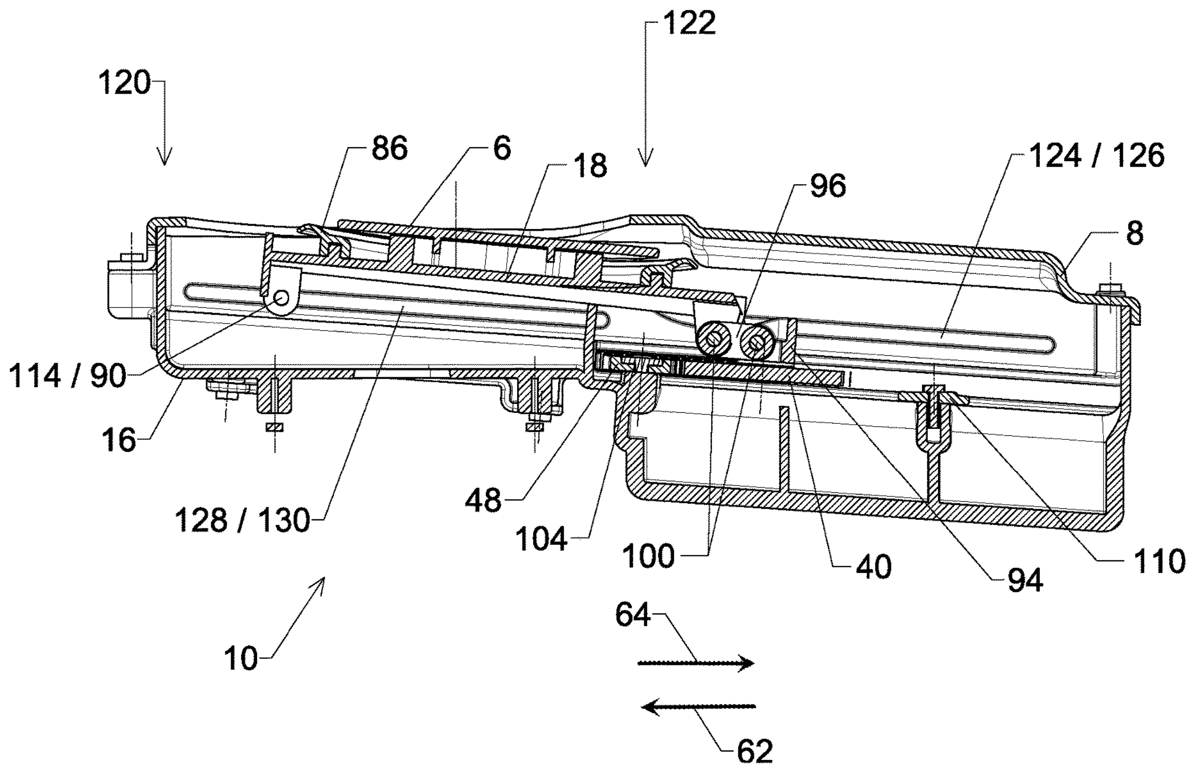
Figure 13:
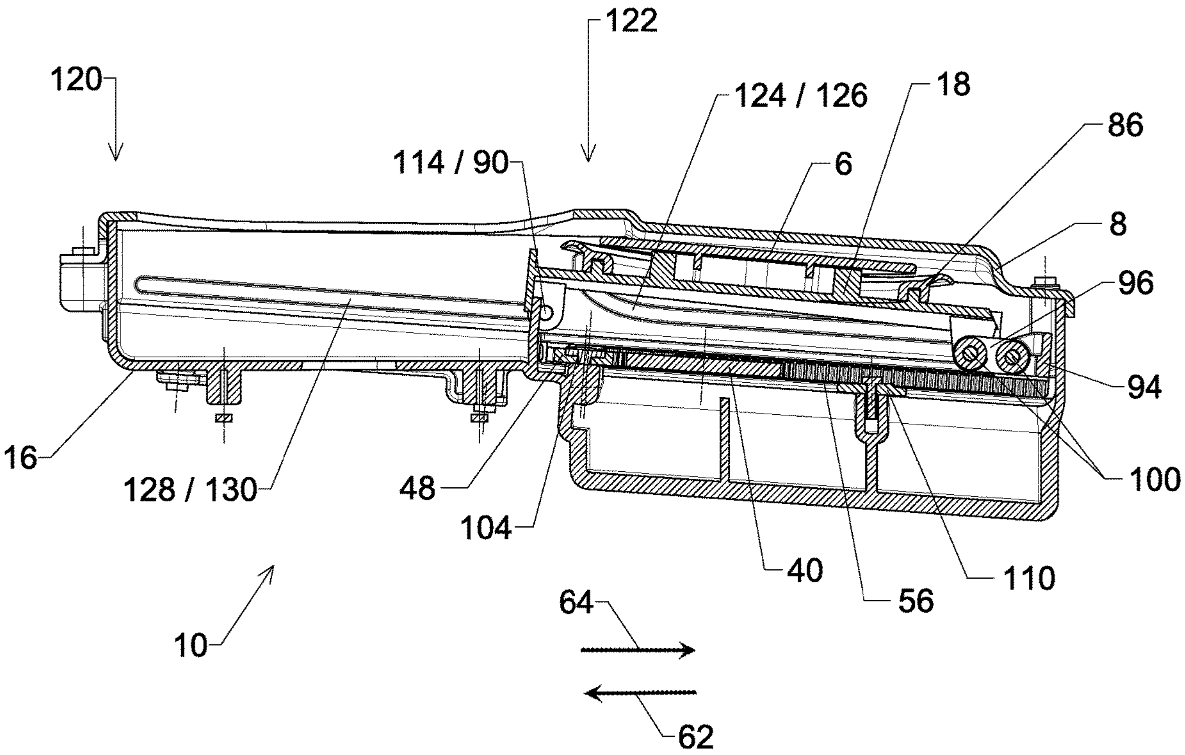

In FIG. 12, the opening and closing device 10 is shown in a position in which the rocker arms 96, 98 are displaced further in the opening direction 64 compared to the position shown in FIG. 10. Finally, in FIG. 13, the opening and closing device 10 is shown in the fully open position, in which the rocker arms 96, 98 are further displaced to the maximum in the opening direction 64 compared to the position shown in FIG. 10.

Figure 14:
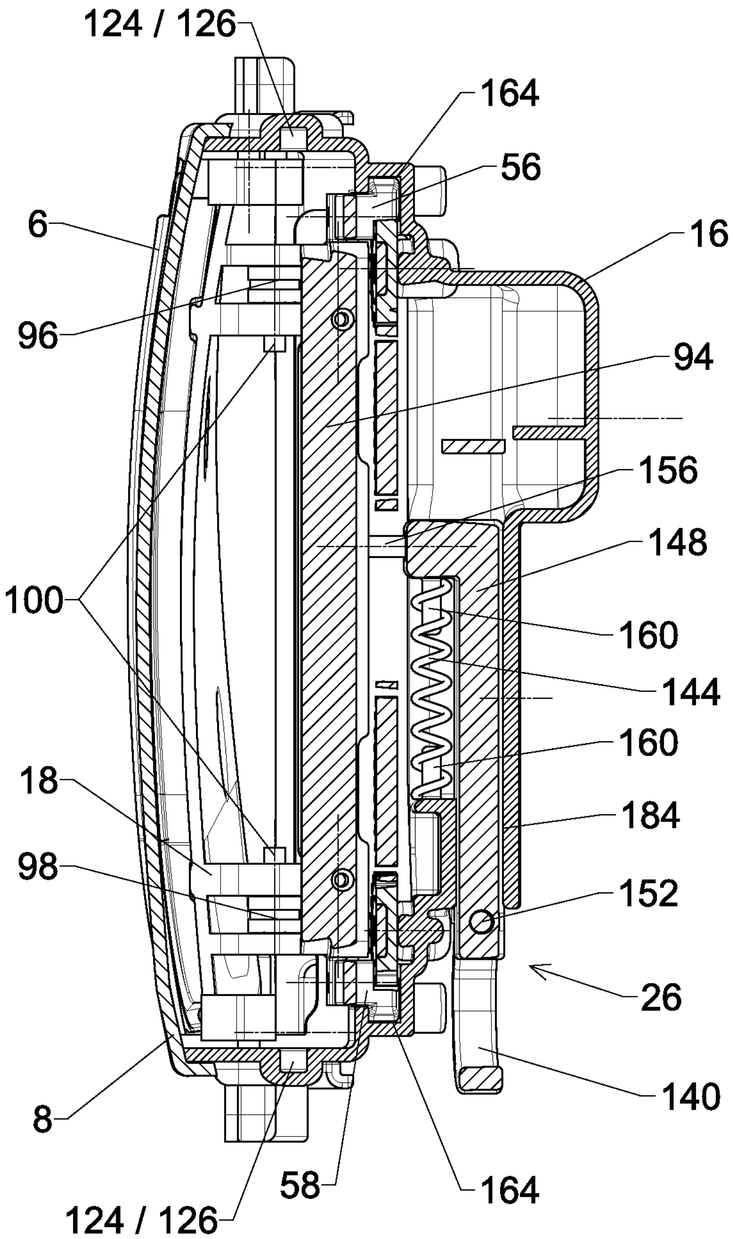
Figure 15:
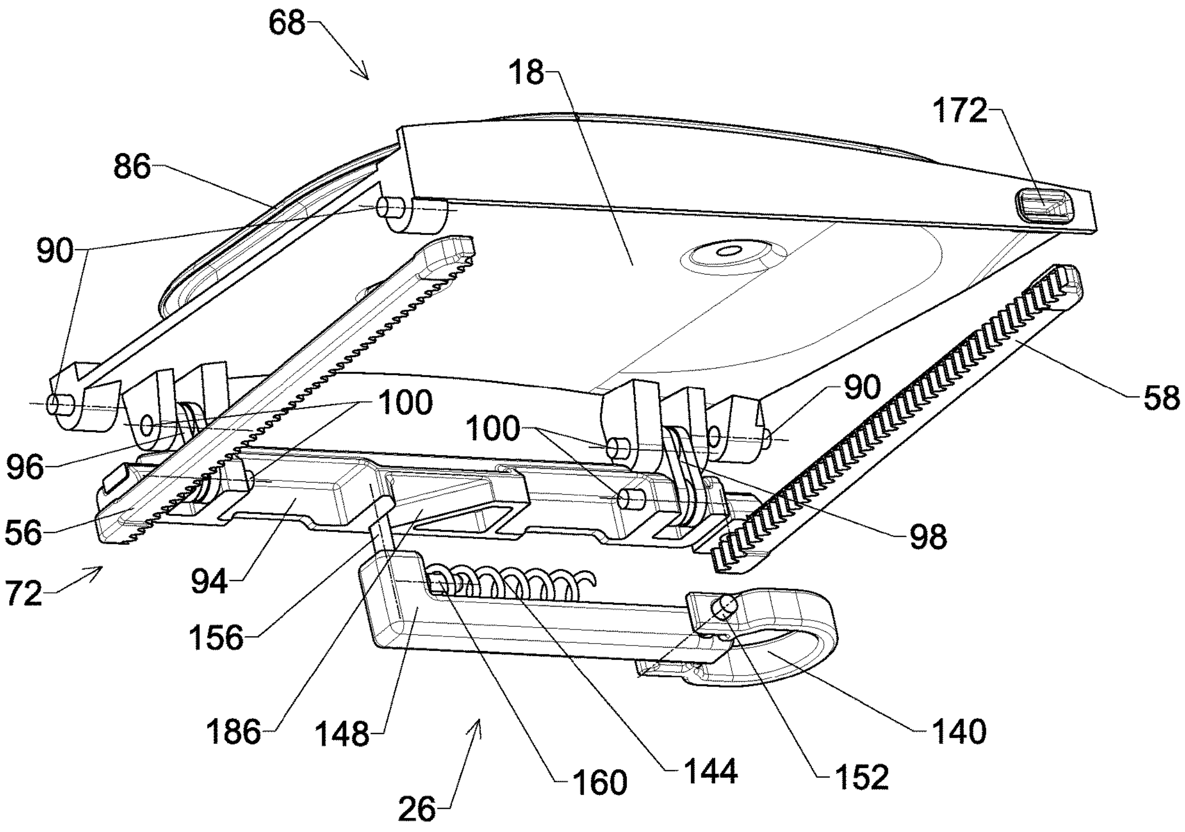
Figure 16:
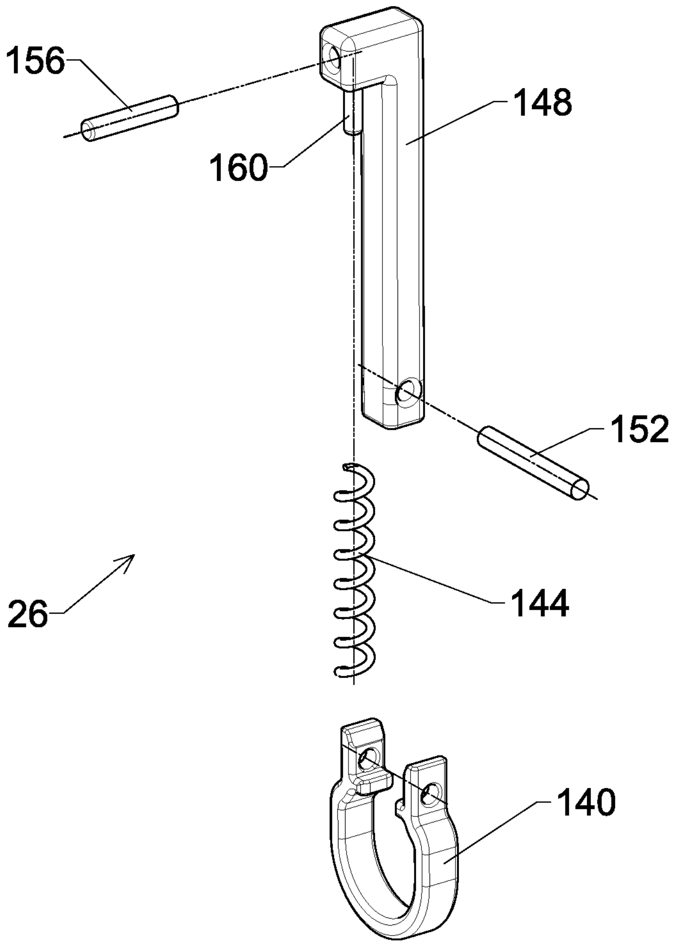

The opening and closing device 10 is shown in a side section in FIG. 14 and in a sectional perspective view in FIG. 15. These figures show the emergency release device 26, which is shown in FIG. 16 in an exploded view. The emergency release device 26 comprises a pull tab 140, which is attached to an emergency release slide 148 by means of an attachment pin 152. A spring centering pin 160 of the emergency release slide 148 accommodates a return spring 144. The emergency release slide 148 accommodates an emergency release pin 156, with the aid of which the emergency release slide 148 engages in the traverse 94. The emergency release device 148 is designed as a pulling device in such a way that when the pull tab 140 is pulled in the opening direction 64, it takes the traverse 94 with it and this is also moved in the opening direction.

The emergency release is pulled perpendicular to the opening direction 64. The emergency release pin 156 runs over an inclined wall (slot) of the traverse 94 and pushes it in the opening direction 64. The pull tab 140 and the fastening pin 152 can be replaced by a pull cable in the vehicle shoring.

Figure 17:
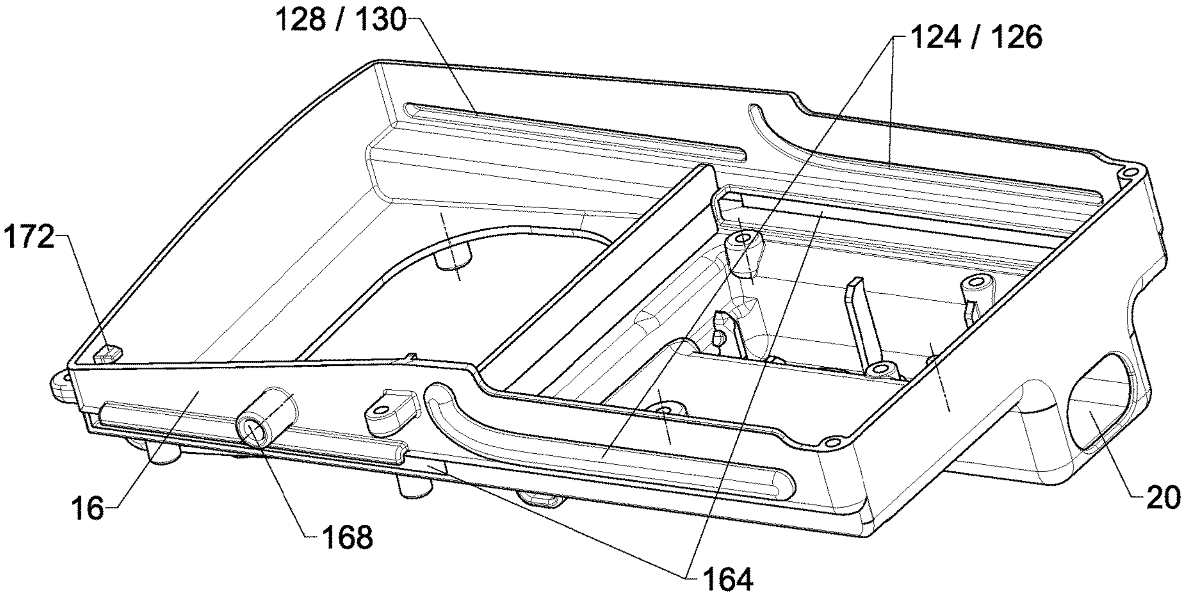
Figure 18:
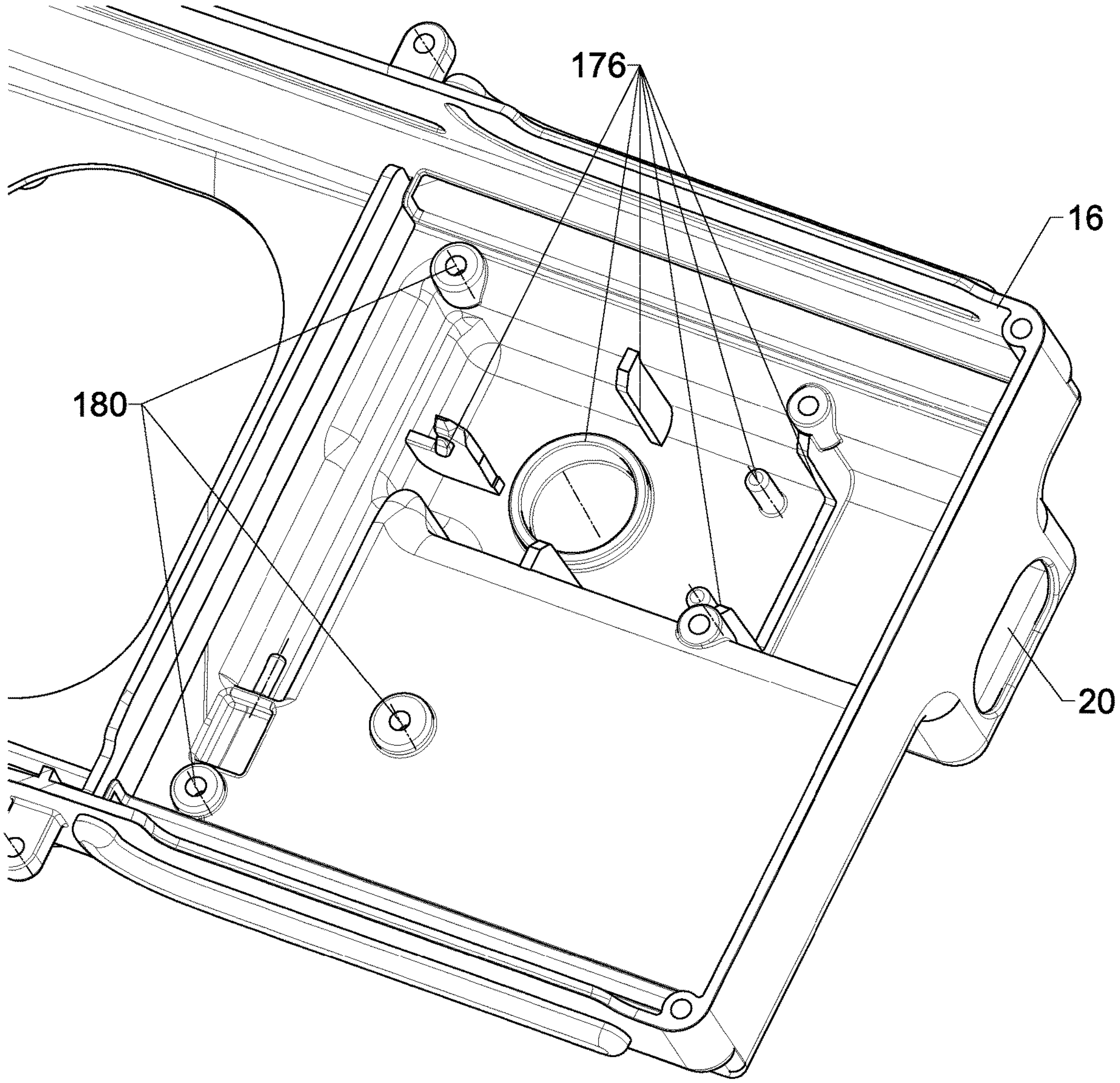

FIG. 17 shows a perspective view of the housing 16 of the opening and closing device 10. It has rack guides 164 for the two gear racks 56, 58. The housing 16 also has a water drain 168 and a Y-centering 172 for the flap carrier 18. FIG. 18 shows a sectional perspective view of the housing 16. The housing 16 has actuator mounts 176 for mounting the actuator 30 and gear wheel mounts 180 for the gear wheels 48, 50 and the gear wheel 44 or intermediate gear wheel.

Figure 19:
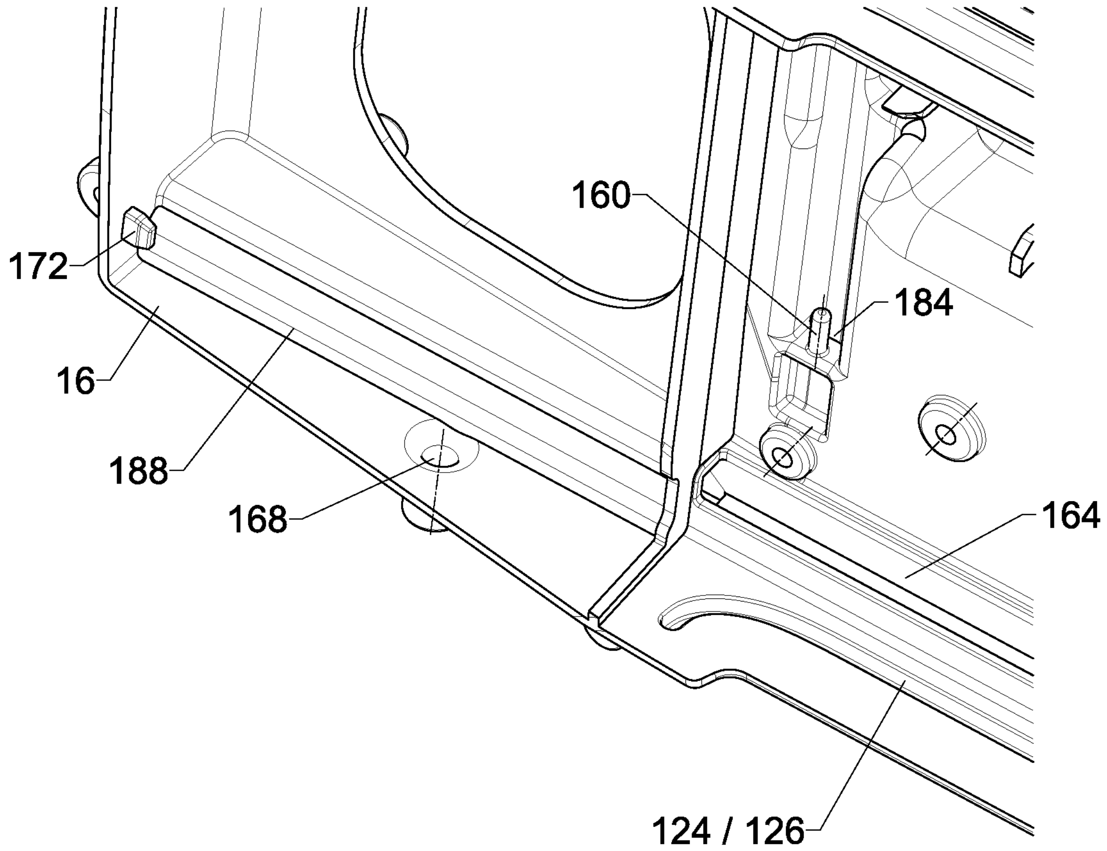

A further sectional perspective view of the housing 16 is shown in FIG. 19. The housing 16 has an emergency release accommodation bushing 184. The emergency release slide, with the return spring 144 clamped, is pushed from the inside through a hole in the housing 16 below the spring centering pin 160. The pull tab is attached to the outside. The housing 16 also has a Y-support 188 for the flap carrier 18 during movement.

Figure 20:
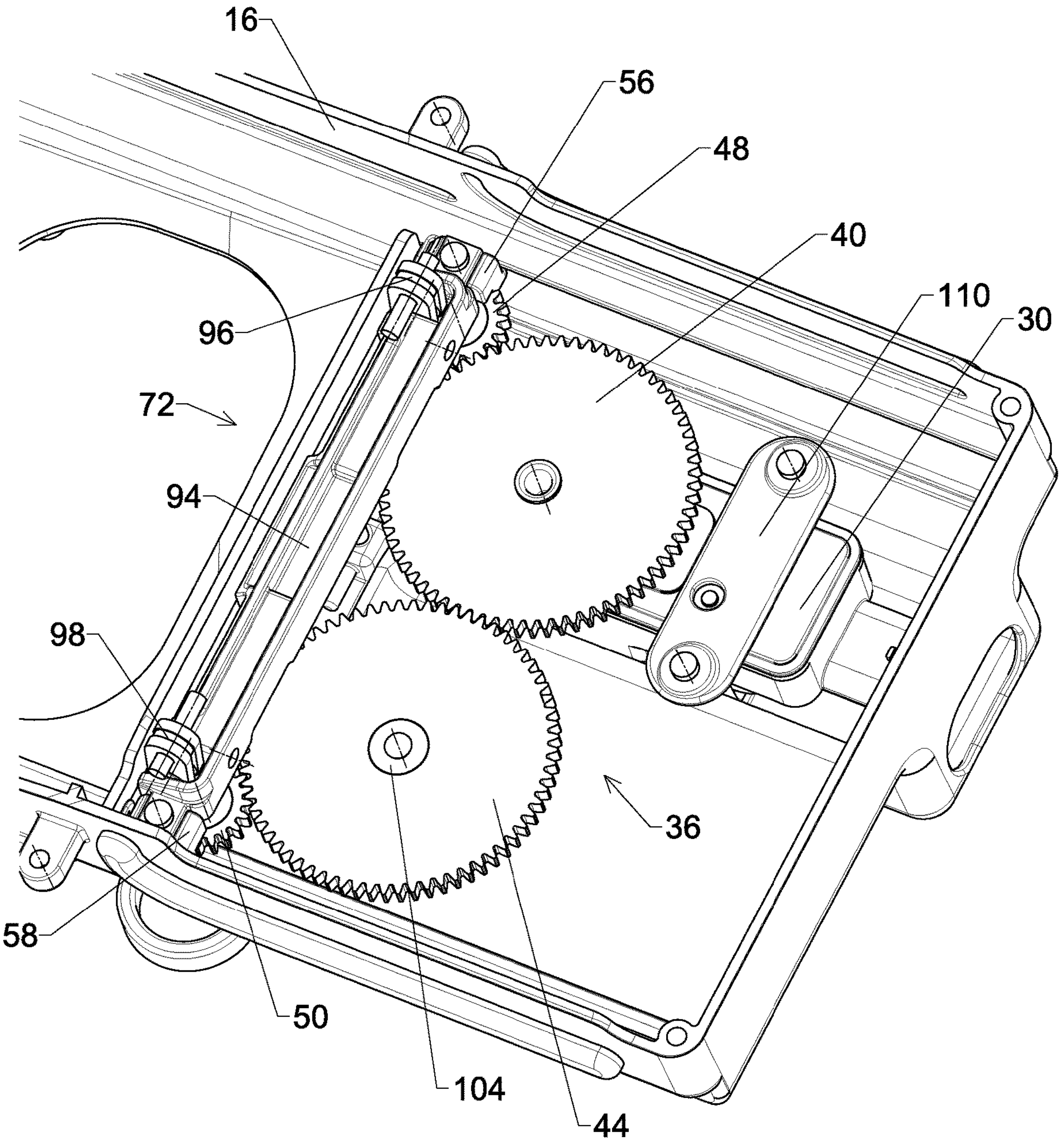
Figure 21:
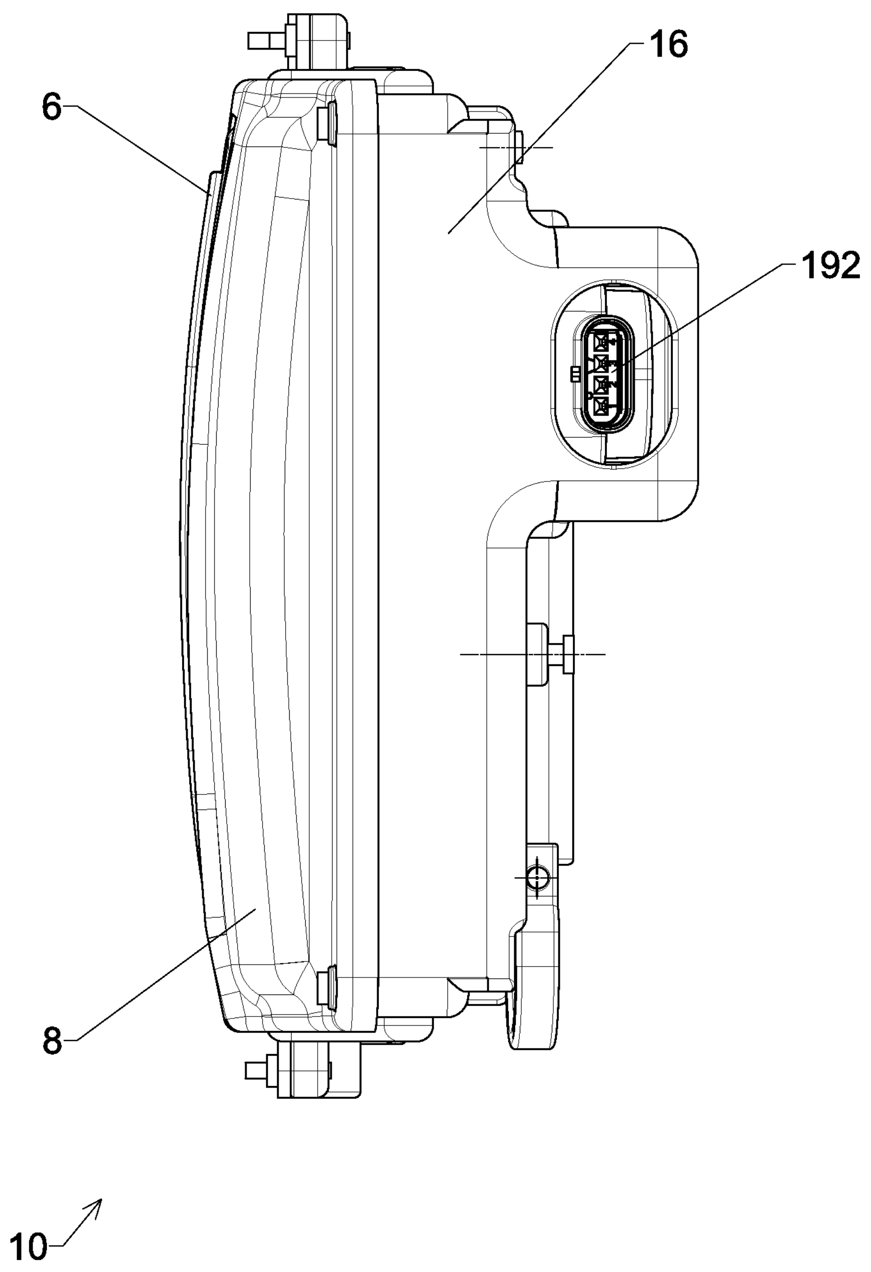
Figure 22:
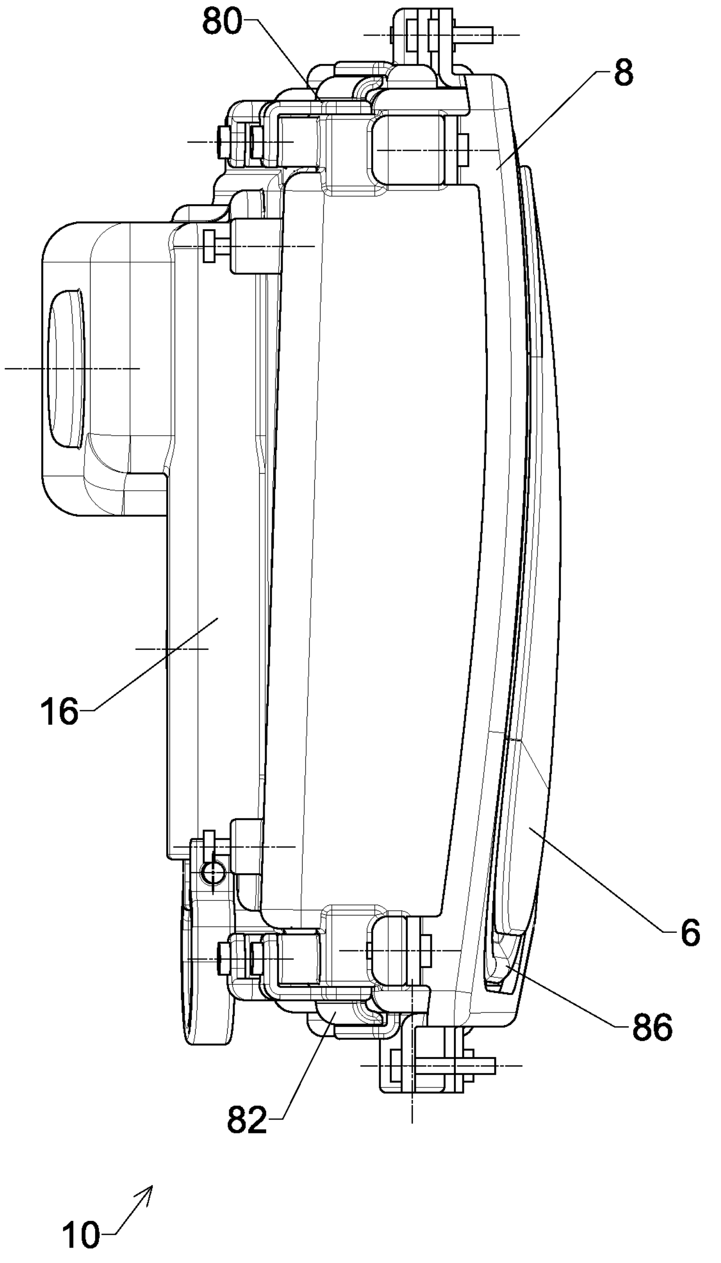
Figure 23:
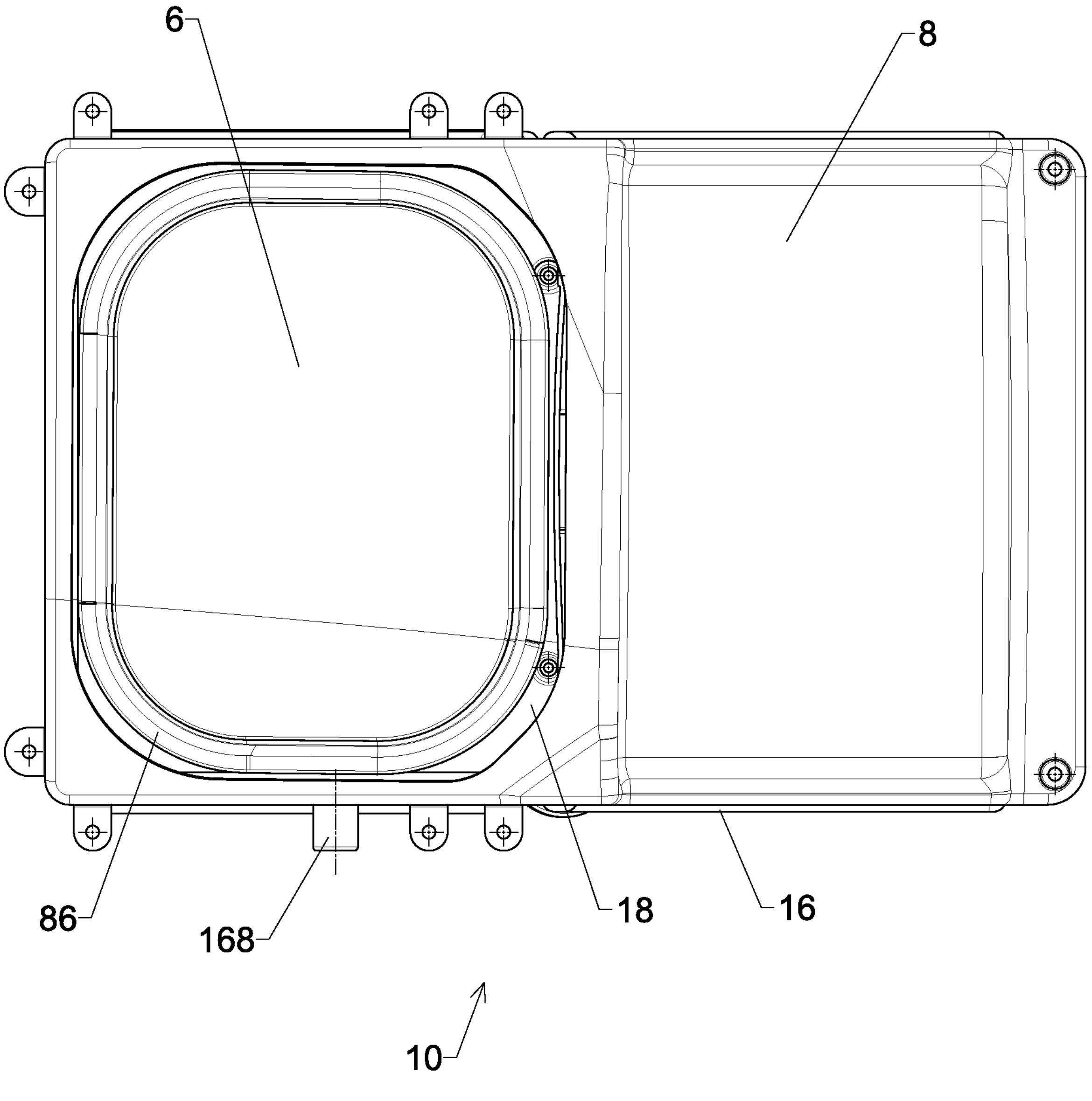
Figure 24:
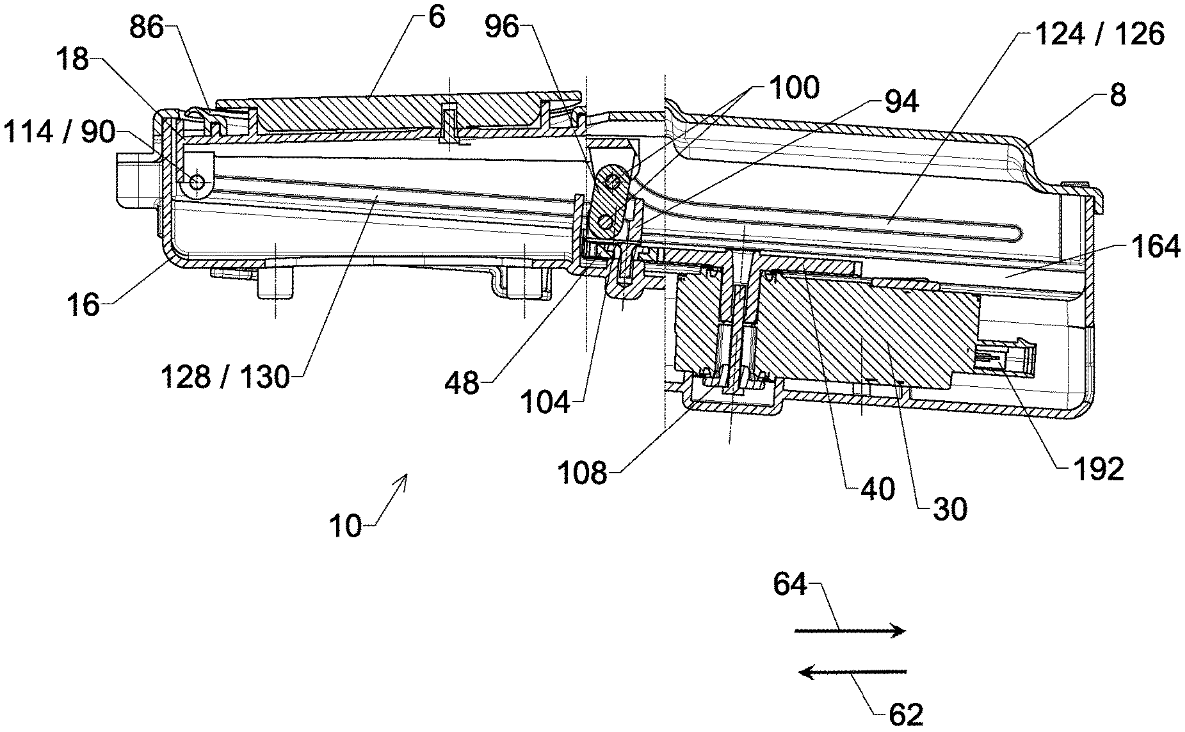

FIG. 20 shows a perspective sectional view of the housing 16 with an inserted actuator 30, synchronous gear unit 36, synchronous gear wheels 48, 50 and traverse 94. FIG. 21 shows the opening and closing device 10 in a side view, in which an actuator plug connection 192 is visible for connecting the actuator 30. FIG. 22 shows housing 16 in another side view. FIG. 23 shows a top view of the opening and closing device 10 and FIG. 24 shows a side section with the actuator 30 inserted.

LIST OF REFERENCE NUMERALS

2 fender
6 flap
8 housing cover
10 opening and closing device
12 charging module
16 housing
18 flap carrier
20 plug bushing
26 emergency release device
30 actuator
36 synchronous gear unit
40 actuator gear wheel
44 intermediate gear wheel
48 first synchronous gear wheel
50 second synchronous gear wheel
56 first gear rack
58 second gear rack
62 closing direction
64 opening direction
68 flap unit
72 rocker arm unit
76 drive unit
80 gear rack guide cover
82 gear rack guide cover
86 seal
90 guide pin
94 traverse or cross-piece
96 rocker arm
98 rocker arm
100 rocker arm shaft
104 gear mount
108 actuator gear mount washer
110 actuator fastening
114 guide element
120 first side
122 second side
124 front guide groove
126 front guide slot
128 rear guide groove
130 rear guide slot
134 direction of force
138 vertical direction
140 pull tab
144 return spring
148 emergency release slider
152 fixing pin
156 emergency release pin
160 spring centering pin
164 gear rack guide
168 water drain
172 Y-centering
176 actuator mount
180 gear wheel mount
184 emergency release accommodation bushing
186 emergency release bevel
188 support
192 actuator male connector

The invention claimed is:

1. An opening and closing device (10), comprising:
a flap unit (68),
an actuator (30) for moving the flap unit (68),
a housing (16), and
an emergency release device (26),
wherein the flap unit (68) has at least one guide element (114) which engages in a guide slot (126, 130) formed in the housing (16),
wherein the flap unit (68) is coupled by at least one coupling element to a traverse (94) and the actuator (30) is configured to displace the traverse (94), and wherein the emergency release device (26) is connected to the traverse (94), said emergency release device (26) comprising a pulling device having a pull tab (140) attached to an emergency release slide (148) that accommodates a return spring (144).

2. The device (10) according to claim 1, wherein the at least one coupling element is designed as a rocker arm (96, 98), which is rotatably attached to the traverse (94) and rotatably attached to the flap unit (68).

3. The device (10) according to claim 1, wherein the traverse (94) comprises at least one gear rack (56, 58).

4. The device (10) according to claim 3, wherein the gear rack (56, 58) is displaceable transversely by a synchronous gear unit (36).

5. The device (10) according to claim 4, wherein two racks (56, 58) are provided with each respective rack arranged on an opposite side of the flap unit (68).

6. The device (10) according to claim 1, wherein two guide elements (114) are provided, and the guide elements (114) are arranged at two opposite sides (120, 122) of the flap unit (68).

7. The device (10) according to claim 1, wherein the housing (16) comprises a mount for the actuator (30).

8. The device (10) according to claim 1, wherein the flap unit (68) comprises a flap (6) and a flap carrier (18).

9. The device (10) according to claim 1, wherein the flap (6) is configured as a charging flap for an electric charging port.

10. An opening and closing device for covering a charging port or a fuel filler neck of a motor vehicle, comprising:

a housing in which at least one guide slot is formed;

a flap unit having at least one guide element adapted to movably engage in the at least one guide slot; and an actuator housed in the housing; and a traverse coupled directly or indirectly to the flap unit, wherein the traverse is displaced by the actuator to in turn move the flap unit along the at least one guide slot; and a pulling device having a pull tab and a return spring, said pulling device being connected to the traverse and configured as an emergency release for the flap unit.

11. The device of claim 10, wherein the flap unit is configured as a charging flap for an electric charging port.

12. The device of claim 10, wherein the flap unit is coupled to the traverse with a rocker arm that is rotatably attached to the traverse and rotatably attached to the flap unit.

13. The device of claim 12, wherein the traverse comprises at least one gear rack.

* * * * *